KEY TO FIG.2. KEY TO FIG.3.

INVENTORS
JAMES A. SPENCER &
EDWIN R. LIBERG
BY Harry Tunick
ATTORNEY

RELAY STORAGE AND SWITCHING ARRANGEMENT

Filed Dec. 10, 1949

INVENTORS
JAMES H. SPENCER &
EDWIN R. LIBERG
BY Harry Tunick
ATTORNEY

RELAY STORAGE AND SWITCHING ARRANGEMENT

Filed Dec. 10, 1949 7 Sheets-Sheet 3

INVENTORS
JAMES A. SPENCER &
EDWIN R. LIBERG
BY Harry Tunick
ATTORNEY

RELAY STORAGE AND SWITCHING ARRANGEMENT

Filed Dec. 10, 1949 7 Sheets-Sheet 4

INVENTORS
JAMES A. SPENCER &
EDWIN R. LIBERG
BY Harry Tunick
ATTORNEY

Dec. 9, 1952 J. A. SPENCER ET AL 2,621,250

RELAY STORAGE AND SWITCHING ARRANGEMENT

Filed Dec. 10, 1949 7 Sheets-Sheet 5

INVENTORS
JAMES A. SPENCER &
EDWIN R. LIBERG
BY Harry Tunick
ATTORNEY

RELAY STORAGE AND SWITCHING ARRANGEMENT

Filed Dec. 10, 1949 7 Sheets-Sheet 6

INVENTORS
JAMES A. SPENCER &
EDWIN R. LIBERG
BY Harry Tunick
ATTORNEY

Dec. 9, 1952 J. A. SPENCER ET AL 2,621,250

RELAY STORAGE AND SWITCHING ARRANGEMENT

Filed Dec. 10, 1949 7 Sheets-Sheet 7

INVENTORS
JAMES A. SPENCER &
EDWIN R. LIBERG
BY Harry Tunick
ATTORNEY

Patented Dec. 9, 1952 2,621,250

UNITED STATES PATENT OFFICE 2,621,250

RELAY STORAGE AND SWITCHING ARRANGEMENT

James Albert Spencer, Teaneck, N. J., and Edwin Raymond Liberg, Brooklyn, N. Y., assignors to Radio Corporation of America, a corporation of Delaware Application December 10, 1949, Serial No. 132,290

14 Claims. (Cl. 178—26)

Figure 1:
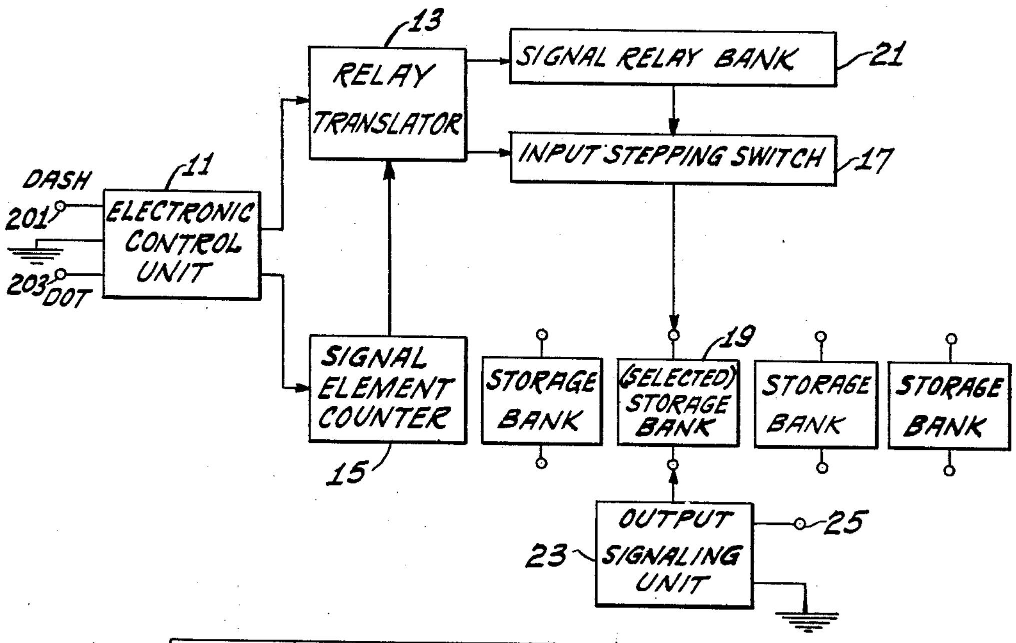
Figure 1:
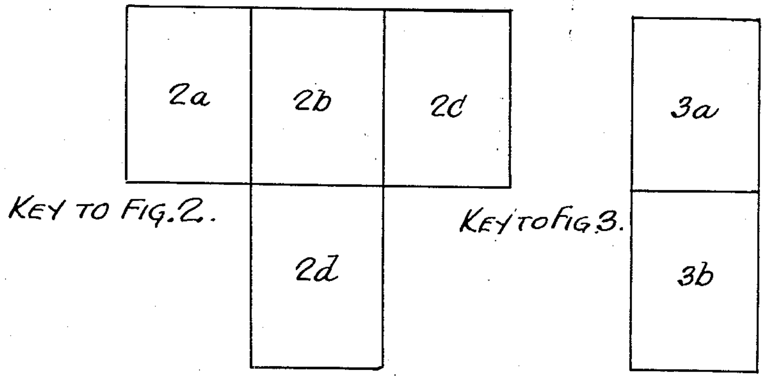

The invention relates to telegraphic signalling systems, and it particularly pertains to storage and switching arrangements for communication systems wherein signals expressing intelligence of a given code are received at a given rate, converted by means of circuit path translation into a different code, and then retransmitted at a higher rate.

In the prior art arrangement the output circuits of translators, such as those of the type disclosed in copending U. S. application, Serial Numbers 709,992, filed November 15, 1946, of L. A. Thomas, E. R. Shenk, and J. A. Spencer, issued December 19, 1950, as U. S. Patent 2,534,387, and 124,313, filed October 29, 1949, of E. R. Shenk and J. C. Phelps, issued December 19, 1950, as U. S. Patent 2,534,388, are connected through the windings of electromagnets for operating the key levers of a machine for producing perforations in a paper tape. In order that a perforated paper tape so obtained be suitable for retransmission of the received intelligence to the desired teleprinters, it must contain case shift code perforations.

A characteristic of the continental Morse and Cable codes conveniently enables all character code groups to be treated as being in the lower case until five or more marking elements are received. If the code group consists of five or more marking elements, the "case shift" function is automatically inserted. Since all signal groups are first treated as lower-case selections, it becomes necessary to insert a lower-case function at the beginning of the next succeeding signal train. This requirement increases the incidental demand upon the system by some three hundred per cent, and results in a material loss to the intelligence rate.

In order to overcome these difficulties and to operate standard teleprinters directly from the output of relay translators, signal storage between the translator output and the teleprinter distributor is required in order to provide overlap for absorbing the incidental speed differences existing between the two types of signaling systems and for inserting functional signals in the teleprinter circuit.

Therefore, it is an object of the invention to provide an arrangement for translating continental Morse or Cable code signals directly into teleprinter code signals, thereby eliminating the delay due to the operation of intermediate apparatus and improving traffic handling operations.

It is another object of the invention to provide a translator free of the requirement for costly and slow operating reperforating mechanisms.

It is a further object of the invention to provide a translator which does not require critical case-shift circuits.

It is still another object of the invention to provide a translator arrangement which eliminates all unnecessary case-shift signals from the output signal trains, thereby materially reducing the demand upon the recording machine and proportionally gaining in intelligence rate.

It is a still further object of the invention to provide a translation capable of determining case shift functions from a predetermined number of marking elements.

These and other objects of the invention which will appear as the specification progresses are attained according to the invention by means of a relay storage and switching system incorporating a counting circuit for counting dot and dash marking elements with respect to the character group in which they appear, switching circuits established through windings of a relay which upon actuation connect one multi-element storage unit of a number of such units available, and a circuit resubmitting the elements in five-unit forms with case shift function characters inserted only where the case of the character under consideration differs from that of the immediately preceding character.

Figure 2A:
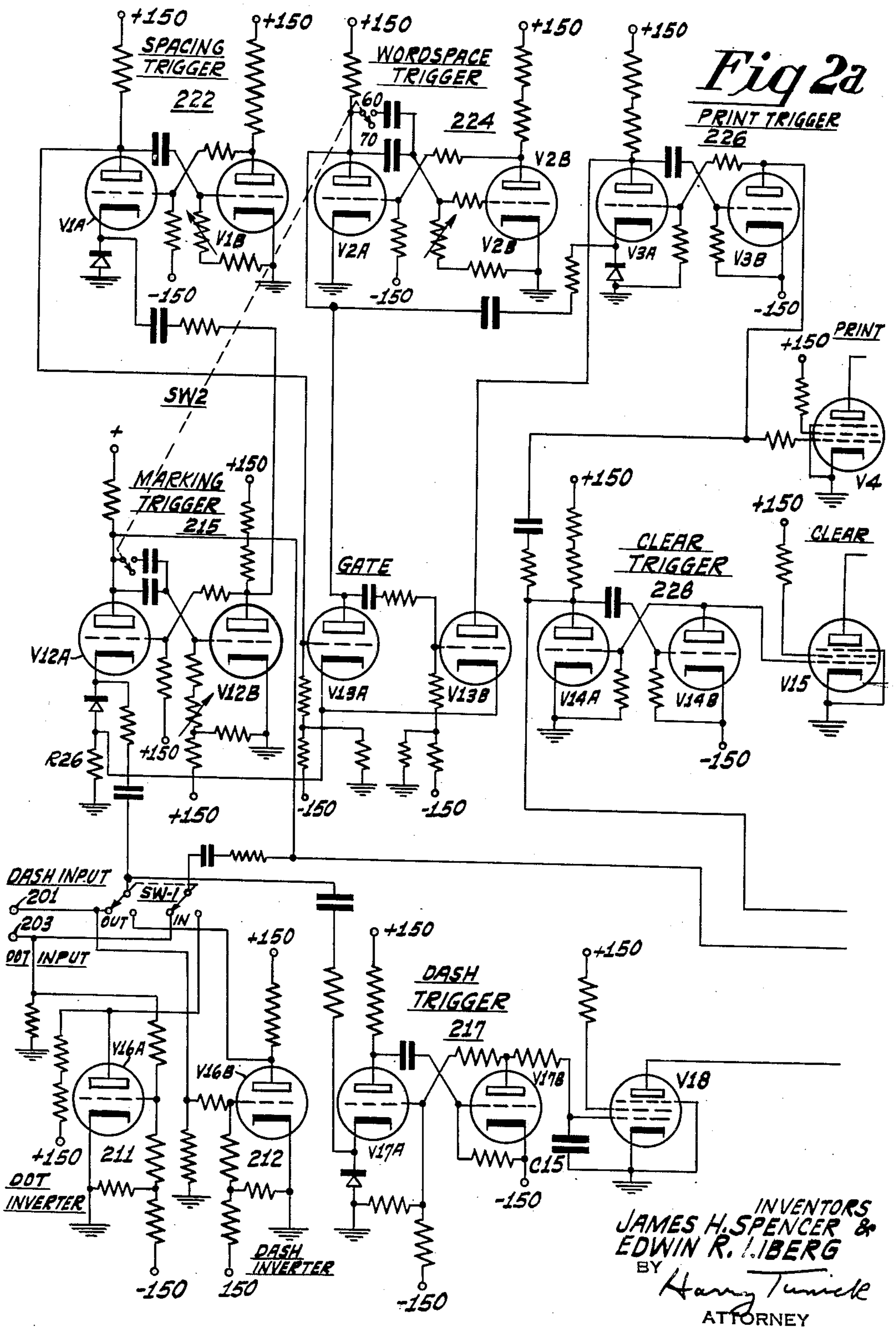
Figure 2B:
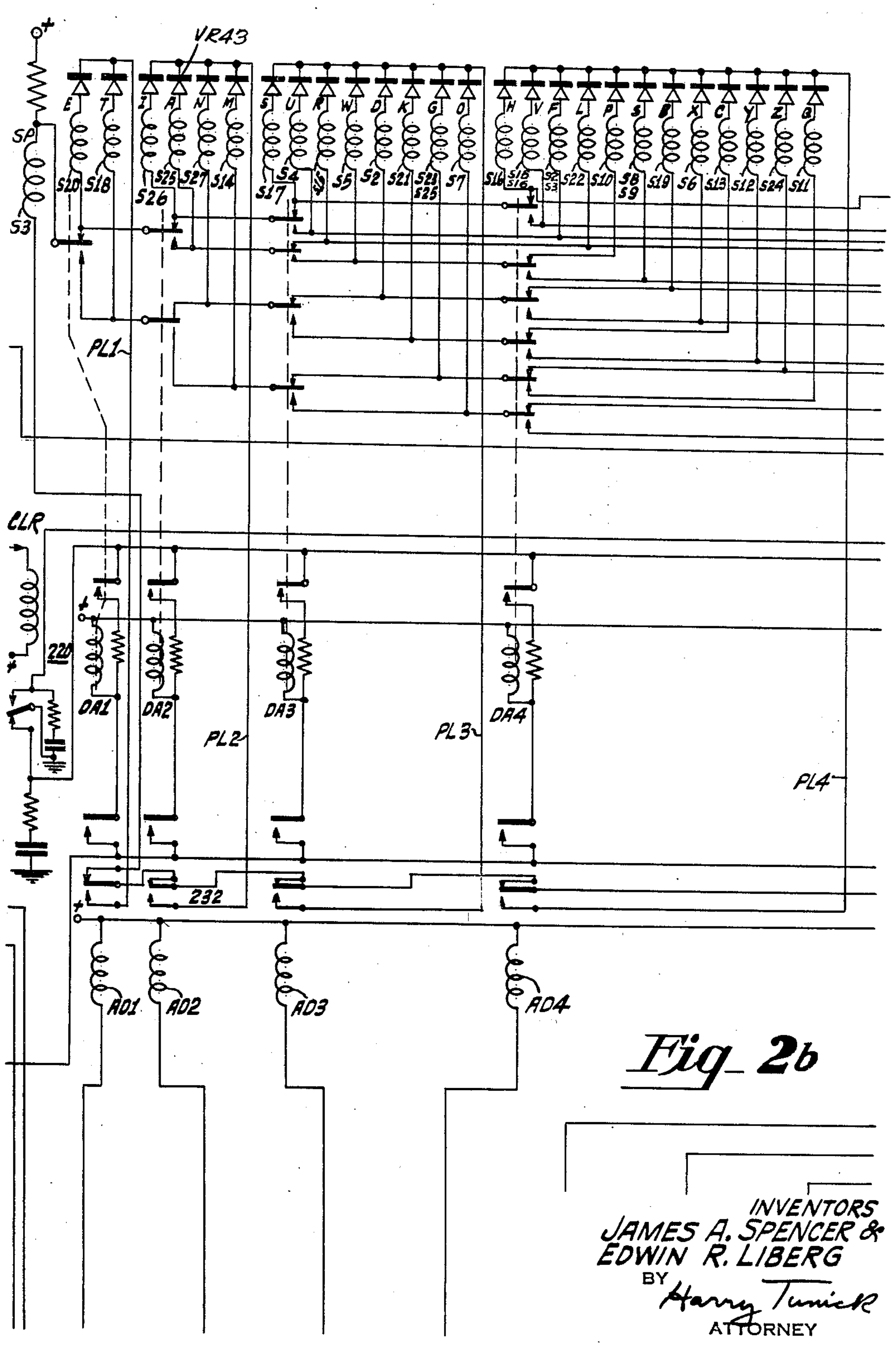
Figure 2C:
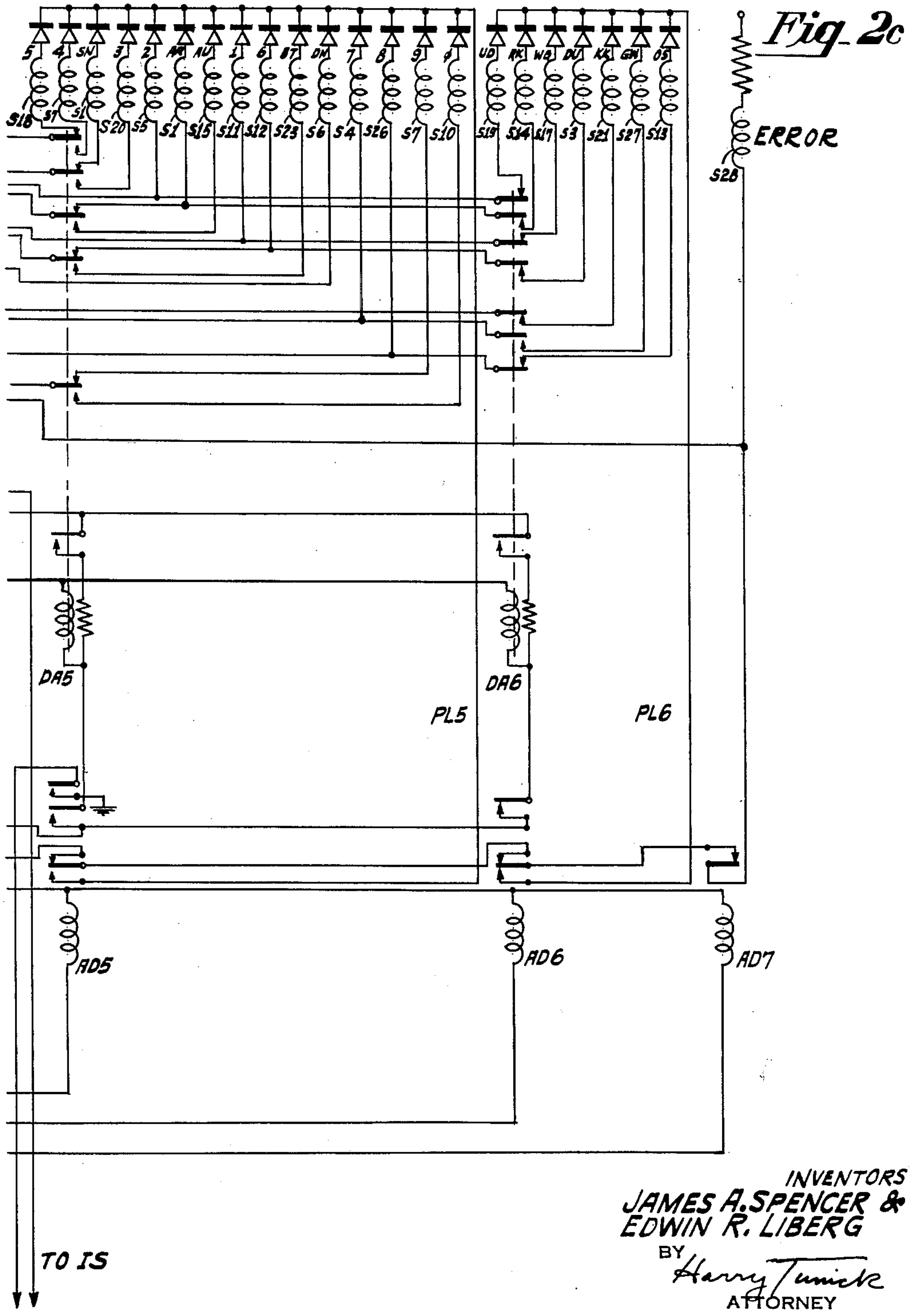
Figure 2D:
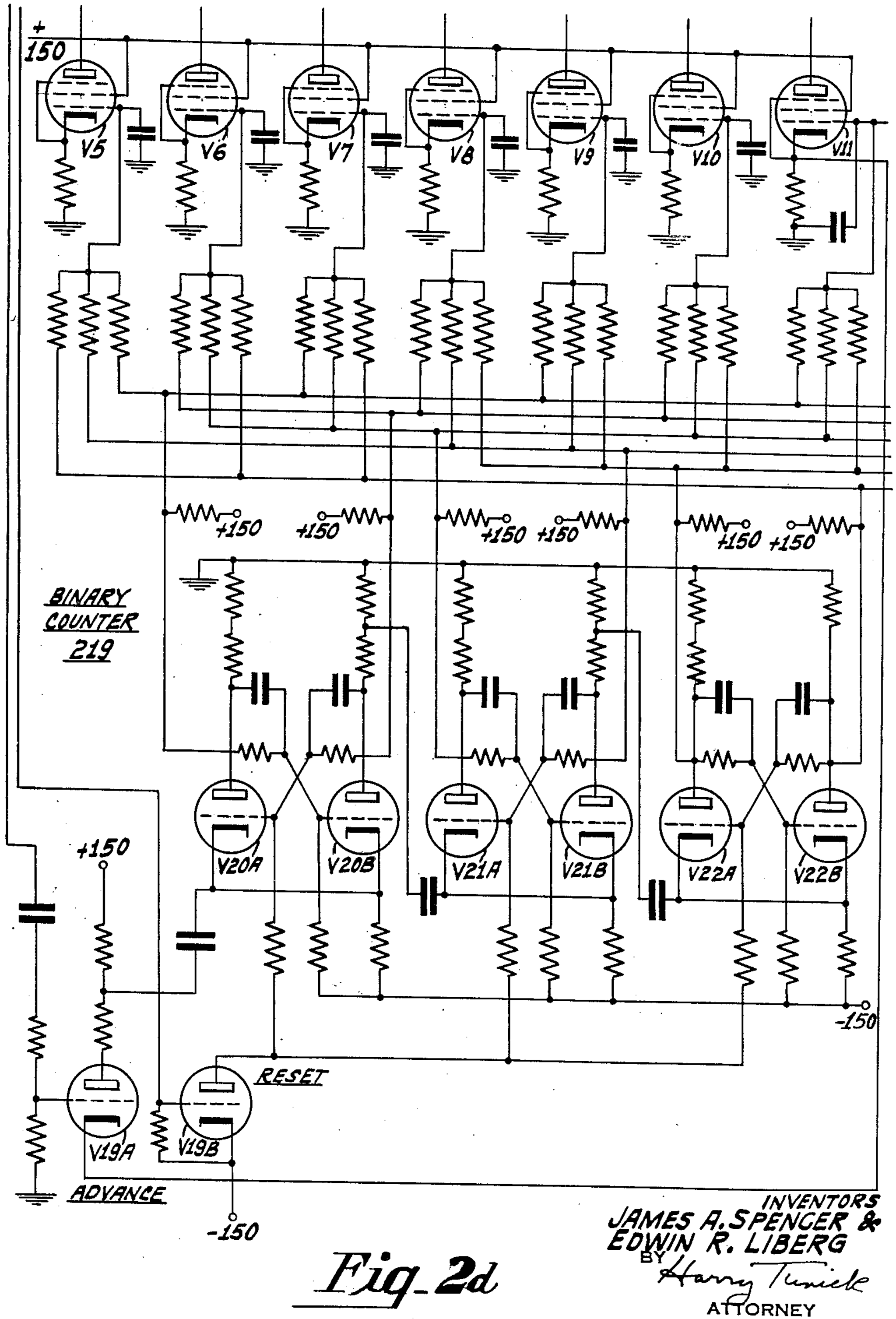
Figure 3A:
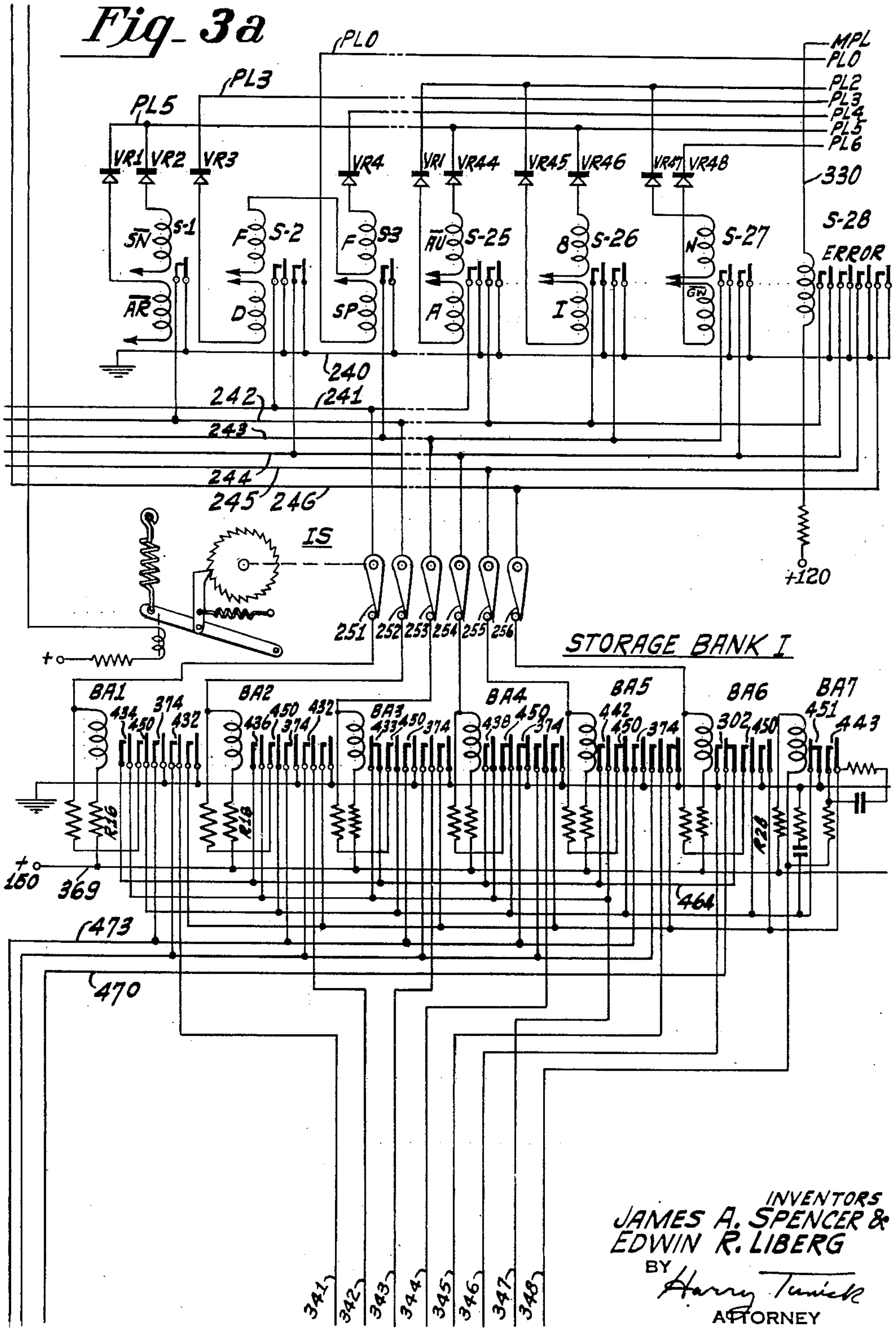
Figure 3B:
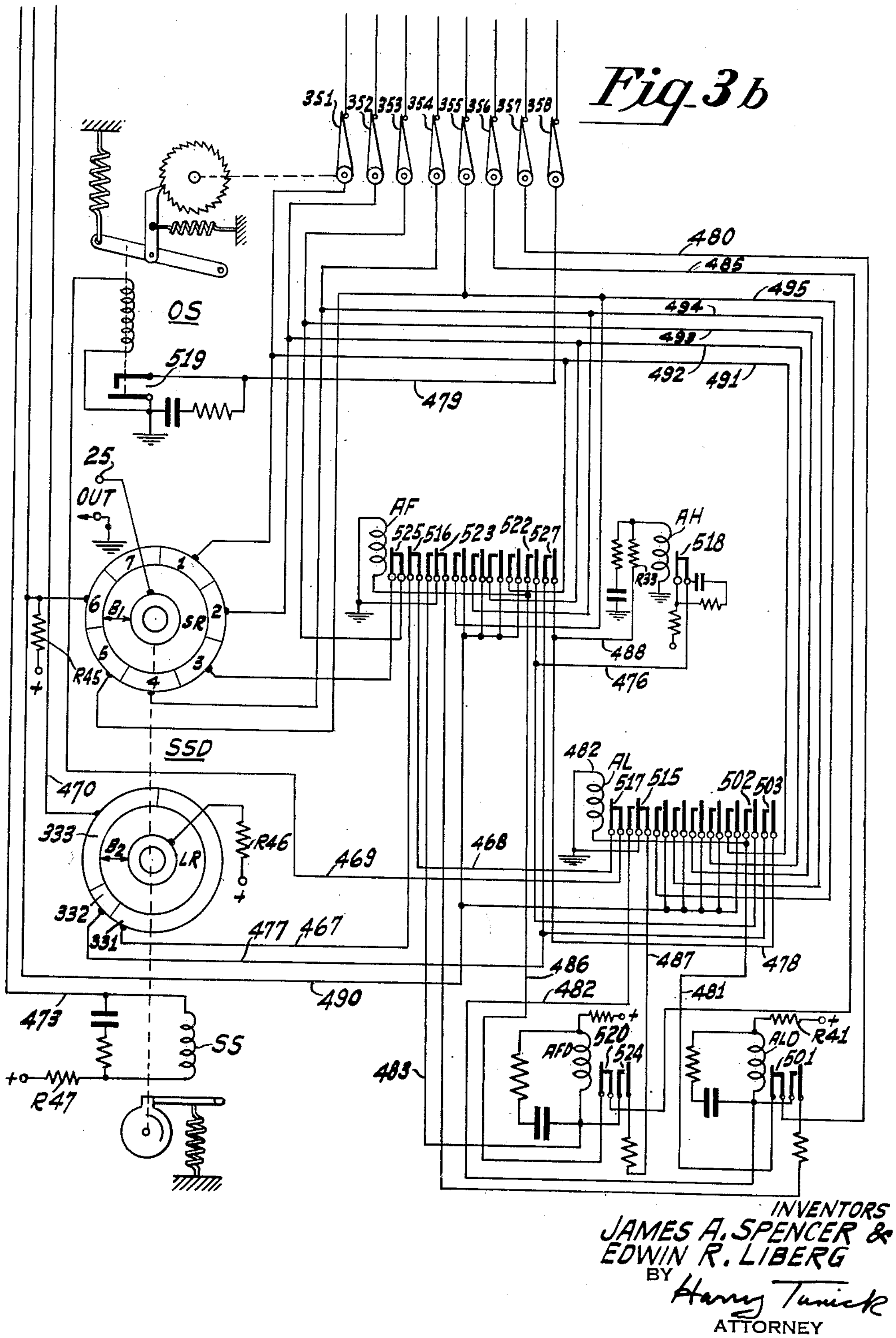

The invention will be described as an integral part of a complete code signal handling installation illustrated in the accompanying drawing forming a part of the specification and in which:

Fig. 1 is a functional diagram of a code handling installation incorporating the invention;

Fig. 2 (Figs. 2*a*, 2*b*, 2*c*, and 2*d* taken together) is a schematic diagram of a portion of the arrangement shown in Fig. 1; and Fig. 3 (Figs. 3*a* and 3*b* taken together) is a schematic diagram of the remainder of the arrangement shown in Fig. 1 according to the invention.

Referring to Fig. 1, there is shown a functional diagram of a relay storage translator according to the invention for converting random length code signals into signals of equal length code, in this instance Cable code signals to 5-unit start-stop teleprinter signals which can be transmitted into a standard typing reperforator where the received copy may be edited.

Dot and dash signal elements obtained from the known Higgitt cable code receiver or the electronic version thereof, both of which separate the dots and dashes received, are applied to the input of an electronic control unit 11, from whence regenerated dash signal elements are applied to a translating system 13 wherein switching is performed only upon receipt of dash code elements, which arrangement eliminates all dot relays and materially reduces the number of contact springs on the dash relays of the prior art translators such as are disclosed in copending applications Serial Numbers 709,992 and 124,318 to which reference is made above.

Output from electronic control unit 11 also actuates a signal element counter 15 which supplies timed current pulses to relay translator 13 to advance operations thereof and to actuate a storage bank input stepping switch 17 to select an idle storage bank 19 and apply currents thereto indicative of the coded character under consideration as supplied by the corresponding signal relay of a signal relay bank 21 under control of relay translator 13. As shown in Fig. 1, the arrangement according to the invention operates first by translating the incoming signals into what may be considered a six-unit code, storing these signals in a selected storage bank 19, of a series of identical storage banks, and at a later time retransmitting them from the banks to an outgoing circuit 25 in 5-unit code by means of an output signalling unit 23 incorporating the well known 5-unit distributor. The arrangement of the codes is such that the first five units of both codes are identical; the sixth unit being used for case-shift purposes. According to the invention output signalling unit 23 incorporates a relay circuit for sensing case shift functions which interposes a case shift signal in the output signal train as obtained at terminals 25 only when the case of the character under consideration differs from that of the immediately preceding character.

A page function inserter can be introduced at this point for retransmitting the messages thus obtained to a remotely located page printer.

While the invention will be described in terms of an arrangement for converting Cable code signals, it can be arranged to accept continental Morse by using a different electronic unit, as will be obvious to one skilled in the art.

Referring now to Fig. 2, the construction and operation of the arrangement outlined above will be detailed.

In the system of translation according to the invention, the Higgitt channel signals are applied to electronic control unit 11 at separate dot and dash input terminals 201, 203. A switch SW1 is provided for polarity selection of the input signals, which are reversed daily as a measure for preserving contacts in the associated receiver. If the marking signal elements are negative, Inverter switch SW1 located on the electronic unit chassis is set in its "Out" position. If the signals are positive, switch SW1 is set in its "In" position to interpose Dot and Dash polarity Inverter circuits 211, 212 in the input lines. Electronic control unit 11 counts the elements of the received code characters and provides timed operating current impulses for operating the Advance, Dash, and Signal relays of the relay switching system. It also provides a "Clear" impulse after each printing operation for resetting Translator 13, thus conditioning it for receiving the succeeding character. The unit is provided with a Rate switch SW2 which serves to change the time constants of Marking trigger 215 and Word Space trigger 224 in order to enable operation at either the 60 or 70 word-per-minute Higgitt speeds, which are standard operating speeds.

The operation of the unit may be described by tracing the reception of the letters "AN." Assuming that signals are negative and that the position of switch SW1 is "Out" and that of SW2 is "70" as shown in Fig. 2*a*, the first marking element being a dot enters electronic unit 11 and is differentiated. This operation forms a negative impulse at the start of the mark and activates Marking trigger 215 for 30 milliseconds. The positive impulse formed at the end of the mark may be ignored. It is preferable to have the length of the input impulses greater than 33 or less than 25 milliseconds so that the end of the signal will not affect Marking trigger restoration. For a more detailed description of the operation of the marking and other triggers, reference may be made to the above mentioned copending applications. Activation of Marking trigger 215 produces a negative impulse on the grid of Advance triode V19*a* and blocks it. This action applies a positive impulse to the input of binary Counting tubes V20*a* and V20*b*. Tube V20*a*, which is normally conducting, is blocked and tube V20*b* is activated. This condition applies a favorable bias on the grid of pentode V5 which conducts through the coil of Counting relay AD1 to energize it. Relay AD1 remains operated until the binary Counting circuit is again activated, at which time it releases and relay AD2 operates. This portion of the signal element counter is so arranged that a train of marking pulses operate Advance Relays AD1 through AD7 sequentially. The operation of relay AD7 blocks further advance marking impulses and prevents counting any further elements until a "Clear" function is performed. Therefore, if reversals are received, the first seven impulses are counted; relay AD7 operates and remains operated until a clear signal is received. This will be prior to the succeeding character. Binary Counter tubes V20*ab*, V21*ab* and V22*ab* are arranged in locking circuits for controling pentodes V5 through V11, which in turn operate relays AD1 through AD7. The operation of tubes V5–V11 is controlled by the binary counter 219 which establishes three coincident voltages on their grids. Counter 219 has a capacity count of 8; the eighth count being the reset count in which only two voltages are coincident on all of the advance pentode grids, therefore, none are conducting.

Restoration of Marking trigger 215 activates Spacing trigger 222 for 30 milliseconds. Restoration of trigger 222 applies a positive pulse on the grid of Gate tube V13*a*. A second pulse has entered the electronic unit 11 via the dash-line 201 and reactivated Marking trigger 215 rendering the cathodes of Gate triodes V13*a* and V13*b* positive due to voltage developed across resistor R26 of Marking trigger 215. This action prevents passage of any pulse during the activation of Marking trigger 215 and restoration of Spacing trigger 222.

The dash impulse tripped the binary tubes releasing relay AD1 and operating relay AD2; it also activated Dash trigger 217 which operated pentode V18 and Dash relay DA2 ten milliseconds later. The 0.010 second delay is brought about by capacitor C15 and is provided to allow the contacts on the AD relays to completely close before current to operate a Dash relay is passed through them. This delay also prevents sparking across contacts of the AD relays.

Restoration of Marking trigger 215 activates

Spacing trigger 222 as before. As the latter restores, it applies a positive impulse to the grid of Gate tube V13a for the second time. Since no marking element is now present, V13a is favorably gated and the pulse is passed, activating Word-Space trigger 224 and Print trigger 226. Print pentode V4 conducts for the duration of the active period of print trigger 226, twenty milliseconds, and provides a path to ground for Print line PL2 via contacts 232 on relay AD2. Signal relay S-25 is operated by current passing through its coil via the path from Print line PL2, Rectifier VR43, and contacts on relays DA1 and DA2 to battery.

The rectifiers shown in Figs. 2b and 2c are provided to prevent the formation of multiple paths from the print lines to signal relays, thus to insure the operation of only one signal relay during a printing operation. In this instance relay S-25, corresponding to the letter A, operated.

Restoration of Print trigger 226 activates Clear trigger 228 for 10 milliseconds which produces a negative pulse on the grid of binary Reset tube V19b. Tube V19b is blocked and resets the binary tubes to their normal condition, and releases relay AD2. Clear pentode V15 then conducts for 10 milliseconds and operates Clear relay 229, thereby releasing Dash relay DA2.

A clearing function always follows the termination of a print impulse. The purpose of this action is to return all tubes and relays to their normal condition preparatory to receiving the next character.

Word-Space trigger 224 restores and produces a positive pulse on the grid of Gate triode V13b but since a marking element in the form of a dash has entered the electronic unit the pulse is blocked. The dash pulse, being the first element of letter "N," operates relays AD1 and DA1 in a manner similar to that described previously for the dash element of letter "A." The second marking element, being a dot, advances the counting chain by operating relay AD2 and releasing relay AD1.

Print and clear functions are performed as before but since a different path has been formed by contacts on relays AD1 and AD2 to Print line PL2, relay S-27, which corresponds to the letter "N," operates. Thus the characters "AN" have been established. Restoration of Word-Space trigger 224 at this time applies a positive pulse on the grid of Gate triode V13b. Since no marking element is present, this tube is favorably gated and the pulse is permitted to pass and activate Print trigger 226 again. No Advance or Dash relays are operated at this time and the only path the print pulse can follow is to the space signal relay S-3 which operates.

The Clear pulse which follows this Print function merely operates the Clear relay 229 because the binary tubes are in their normal condition due to the previous Clearout. Therefore, the characters "AN" followed by a word-space has been translated through the signal relays.

If the incoming speed of the signal had been 62.5 W. P. M., switch SW2 would be placed on "60." The function of the various components just described for the 70.9 W. P. M. rate would be the same except for two trigger functions.

The length of a half-dot cycle at 62.5 W. P. M. is 53.3 milliseconds, therefore, it is necessary to change the timing of the marking trigger 215 to 37 milliseconds and the word space trigger 224 to 53 milliseconds in order to meet the new timing conditions. Placing the switch in the "60" position appropriately changes the timing by increasing the capacity of the trigger timing circuit.

Counting relays AD1-AD7 and Translating relays DA1-DA6 establish electric current paths, determined by the signal translated to route the print operating impulse from the electronic unit through windings of the selected Signal relay. The fifth Counting relay AD5, in addition to counting the received code impulses, senses the case requirement (Letters or Figures, of the received signal group. When operated, relay AD5 completes an additional circuit to be described hereinafter.

Up to this point the intelligence character under consideration received in random length code has been identified with a particular signal winding, the letter "T" for example with winding S18, which winding being energized by means of print trigger 226 can be arranged to operate the corresponding key lever of a perforator as in the arrangement of previously mentioned copending application Serial Number 124,318, now Patent Number 2,534,388, dated December 19, 1950, save that the case shift function has not as yet been provided.

As previously intimated, the case shift function is taken care of according to the invention by use of a signal element storage system. In the preferred embodiment of the invention the windings S1-S28 shown in Figs. 2b and 2c are constituted by the windings of a group of twenty-eight signal relays. Referring to Fig. 3a, there are shown seven of these relays S1-S3 and S25-S28.

Signal relays S1-S28 are provided with contact assemblies suitable for forming 5-Unit code signals. These contacts connect power to one or more of five bus-bars 241-245 corresponding to the elemental units of the 5-Unit Printer Code, depending on the character assigned to the relay under consideration. Connections for the contact assemblies of relays S1-S3 and S25-S28 being as shown, the associated contact assemblies of the remaining relays are connected in similar fashion observing the proper combinations and permutations of the code employed as will be obvious to one skilled in the art. Also, it should be noted that while the windings are shown separated in Figs. 2b and 2c, they may be combined with respect to the associated contact assemblies as shown in Fig. 3a since the 5-Unit signals are the same for both upper and lower case characters, the case being indicated by separate case shift signals as is well known to the artisan. The five bus-bars 241-245 terminate on corresponding wiper arms 251-255 of an Input rotary Switch IS. A sixth conductor 246 connects the sixth wiper arm 256 to contacts on Counting relay AD5 to connect Six-Unit Code combinations to the Storage relays BA1-BA6 in accordance with the selections obtained through the operation of Counting relays AD1-AD7 and Translating relays DA1-DA6.

While any convenient switching arrangement may be employed for the purpose, in actual practice input stepping switch IS is preferably an eight-level, twenty-point switch activated by impulses connected through its operating coil by Clearout relay 229. Six wiper arms 251-256 connect to the six Signaling conductors or busses 241-246, leaving two wipers unused. The coil windings of six Storage relays BA1-BA6 within each bank are so connected to the switch points that the ten identical storage relay banks I-X (of which only I is shown) are sequentially connected to the Signaling conductors.

Although the storage relay assembly as contemplated for actual practice consists of ten groups or banks of relays, it is within the scope of the invention to use any number of banks that may be called for by the particular operating problems involved. Each bank is comprised of seven relays, BA1–BA7, one for each element of the 5-Unit Code BA1–BA5, one, BA6, for Case indication and one, BA7, for Clearout purposes. The storing relays BA1–BA6 are provided with holding contacts 450 which are connected in multiple, thence to contacts 451 on Clear relay BA7. Additional contacts 442 on relay BA5 and 443 on relay BA7 are also provided for connecting the signaling circuits to points 357 and 358 on output stepping Switch OS and contacts 374 on all storing relays for releasing the brushes of start-stop Distributor SSD. An arrangement for disabling the shift circuits whenever word-space follows an uppercase condition is also incorporated in each relay bank and will be described hereinafter.

An Output stepping Switch OS, identical with Input Switch IS, is employed to interconnect Storage relay bank I with start-stop Distributor SSD and to the contacts of Shift relays. It is activated by impulses derived from a segment 331 located on the start-stop distributor faceplate, it advances one step following each transmission except during times when a case-shift signal is transmitted.

Five relays, AF, AH, AL, AFD, and ALD, are provided for automatically inserting the obverse and reverse case-shift signals in the output signal train and for memorizing the last case transmission. Relays AF and AL, when in an operated condition, connect potentials representative of Figures and Letters combination respectively to the face-plate. Relays AFD and ALD serve to memorize the last case transmission. Relay AH opens the holding circuit for relays AF and AL immediately following a case transmission. The circuit arrangement is such that whenever a case shift is indicated by a change in the condition of the storage bank relay BA6, either relay AL or AF, depending upon the requirement, will operate and simultaneously open the operating circuit for the Output stepping Switch OS and connect circuits applying potentials representative of shift signals to the distributor segments. Relays ALD and AFD operate and lock up immediately following the closure of the contacts on relays AL and AF. Relay ALD opens the activating circuit for relay AL so that it cannot operate again until after relay AF has operated. Relay AFD is similarly connected. The holding circuit for relay AFD is routed through contacts on relay ALD. The holding circuit for relay ALD is similarly routed through contacts on relay AFD, thus establishing circuits for preventing repetition of shift operations so long as Case relay BA6 within any connected storage bank remains constantly in either operated or unoperated condition.

Start-stop transmitting distributor SSD consists of two pairs of concentric metal rings SR and LR mounted on an insulating base and traversed by brushes B1 and B2 in the well known start-stop distributor fashion. One ring in each pair is divided into segments which are insulated from one another. Their mates are solid or collector rings. The rings are connected as shown in Fig. 3*b*. Brushes B1 and B2 rotate over the faceplate at the rate of 450 revolutions per minute, corresponding to 75 words per minute.

The operation of the Case Shift Sensing circuitry will be described in terms of specific characters, it being understood that other characters are handled in similar fashion.

Consider that the Morse letter 'A" is received. The 5-Unit distributor brushes are in their "Stop" position as shown. Steady "marking battery" is connected to the printer Output Signaling circuit at terminals 25. A circuit is completed from Translator 13 through winding of Signal relay S25, rectifier VR43, conductor 330 to the anode of Print pentode V4. Relay S25 operates, and connects ground potential from conductor 240 to bus-bars 241 and 242.

Bus-bars 241 to 245 and 246 (figures) connect to corresponding arms in Input Switch IS, which in turn connect to the winding of Storage relays BA1–BA6, inclusive, in selected storage bank I.

Since relays S25 and Input Switch IS are operated, a circuit is established from bus-bars 241 and 242, through contacts 251 and 252 of Switch IS, the windings of relays BA1, BA2, resistors R16 and R18, respectively, and conductor 369 in common to power. Relays BA1, BA2 operate and lock up by battery coming from plus 120, through conductor 369, the windings of relays BA1, BA2, contacts 450, conductor 456, contacts 451 on Relay BA7, and conductor 240 to ground. The letter "A" is then stored in Storage bank I in 5-unit code.

The translator Clear relay 220 operates to clear the translator switches and conveys a ground impulse to Input stepping Switch IS magnet, connecting the succeeding Storage bank (II) to busbars 241–246 in preparation to receive and store the succeeding character.

At this time three circuits are simultaneously completed; the first two from plus over conductor 369, contacts 432 on relays BA1 and BA2, conductors 341 and 342, the contacts 351 and 352 of switch OS, and bus-bar 241 and 242, thence to segments 1 and 2, respectively, of teleprinter distributor SSD. The third circuit is traced from ground conductor 249 through contacts 374 on relays BA1 and BA2, conductor 473, the winding of magnet SS and resistor RA7 to power to free distributor SSD for rotation.

As soon as the brushes leave their "Stop" position, Brushes B2 complete a circuit from plus through resistor R46, conductor 470, contacts 302 on Case relay BA6, conductor 464, contacts 433 on relay BA3, conductor 347, switch points 357, conductor 480, contacts 501 on Letters Detector relay ALD, conductor 481, contact 502 on Letters relay AL, conductor 482 and the winding of Letters relay AL to ground. Letters relay AL operates and connects power from plus through resistor R45 through conductor 490 to busses 491–495, thence to the five distributor segments so that on the first revolution of the distributor brushes a Letters signal is sent to the printer to establish lower-case reception.

When Letters relay operated a circuit was established from ground through contacts 515, conductor 432, through the winding of Letters Detector relay ALD and resistor R41 to plus causing Letters Detector relay ALD to lock up and open the circuit from conductor 480, thereby locking out all subsequent Letters Shifts until Letters Detector relay ALD is released by the operation of Figures Detector relay AFD.

The circuit from Output Stepping segment 331 over conductor 467, contacts 516 on relay AF, conductor 468 through Stepping magnet OS winding is now open at contacts 517 on relay AL so that Switch OS is not operated during the first sweep of the brushes.

The holding circuit for Letters Detector relay ALD is traced from plus through R41, relay ALD winding, conductor 482, contacts 515 on relay AL to ground. Letters Detector relay, therefore, remains operated until Figures relay operates.

The holding circuit for Letters relay AL is traced from plus through R34, contacts 518 on relay AH, conductor 476, contacts 502, conductor 482 and the winding of Letters relay AL to ground.

At approximately the end of segment No. 5 on the Transmitting ring SR, brushes B2 traverse segment 332 on the Local ring LR and connect power from plus through resistor R46, conductor 477, contacts 503 on relay AL, conductor 478, resistor R33, and the coil of Holding relay AH to ground. Relay AH then operates and removes the holding power from Letters relay AL which releases and closes the stepping circuit through switch coil OS. Brushes B2 having already passed over the output stepping segment 331, the letter "A" stored in Storage bank I remains connected to the distributor segments and is transmitted to the outgoing circuit at terminal 23 upon the next succeeding revolution of the distributor brushes. As brushes B2 traverse output Stepping segment 331 an impulse is transmitted over conductor 467 through the coil winding of stepping magnet OS to ground. As the armature of magnet OS is drawn toward its pole-piece contacts 519 close and complete a circuit from ground over conductor 479, through switch points 358, conductor 348, and the coil winding of Clearing relay BA7, resistor R28 and conductor 369 to power plus. Relay BA7 operates and opens the holding circuits to all relays in Storage bank I; succeeding banks are similarly operated and made ready to accept the succeeding character signals.

Conductor 473 is connected to one member of a pair of contacts 374 of each of the first five relays BA1–BA5 in each bank etc. The mates to these contacts all connect to ground conductor 240 so that as long as any one of the first five relays in any storage is in an operated condition, magnet SS is energized and brushes B1 and B2 rotate. If, however, none of the first five relays in any bank are operated, then the circuit through magnet SS is open and the brushes stop in the position shown in the drawing.

Assuming that the last received character was a lower-case selection, the sixth Storage relay was unoperated and the Letters Detector relay ALD locked operated. If the instant reception is (Figure) "3," Storage relays BA1 and BA6 operate. The circuits established by the operation of relay BA1 terminate on face-plate segment 1 in the same manner as hereinbefore described in connection with the reception of letters "AN."

Since relay BA6 is also operated, a circuit is established from conductor 479 through tongue 392 and its make contact, conductor 368, switch points 356, conductor 485, contacts 526, conductor 486 to one member of contacts 522 and the winding of Figures relay AF to ground. Figures relay AF operates and locks up by current flowing from plus through contacts 518, conductor 476 and contacts 522. As Figures relay operates, a circuit is completed from ground through contacts 523, conductor 488, and the winding of Figures Detector relay AFD to power plus, causing that relay to operate and lock up by a circuit from ground through contacts 515 of relay AL, conductor 487 and contacts 524 of relay AFD.

When Figures relay operated, signaling battery was connected from plus through four of its contacts to bus-bars 491, 492, 494, and 495, thence to corresponding faceplate segments to ready a figures case shift signal for transmission.

The circuit to transmitting faceplate segment 3 is at this time open at contact 525 on relay AF and as the brushes sweep the faceplate segments, the Figures code signal train is transmitted to the teleprinter circuit.

When the distributor brush B1 is at the end of the fifth segment, brush B2 operates to transmit an impulse from plus, through resistor R46, segment 332, conductor 477, through contacts 527, conductor 483 and the coil winding of relay AH to ground. Relay AH operates, opens contacts 518 which disconnects holding current from conductor 476 and the coil winding of relay AF causing that relay to release and disconnect signalling current from busbars 491, 492, 494 and 495. Contacts 525 on relay AF then close and connect faceplate segment 3 to busbar 493, contacts 516 also close and reestablish the circuit from the magnet of stepping switch OS over conductor 467 to the Output stepping segment 331 thus preparing stepping switch to operate upon completion of the next succeeding revolution of brushes B2. However, since contacts 516 did not close until after brushes B2 had traversed the output stepping segment, storage bank I remains connected to the transmitting segments and the Figure 3 code signals are transmitted to the teleprinter.

Word-space is recognized as being a lower-case selection. For this reason it requires special treatment in order to avoid case shift at times when word-space is received following the translation of upper-case characters.

The No. 3 relays (BA3, etc.) in all of the storage banks are therefore provided with a pair of break contacts 433, and the remaining relays with make contacts at 434, 436, 438, and 442.

Contacts 433 are connected in series with conductor 464 and contacts 434, 436, 438, and 442 in shunt across contacts 433. In this arrangement if contacts 433 only open, the shift circuit is disabled, but if contacts 433 and any one or more of contacts 434, 436, 438, and 442 operate, then the shift circuit is closed.

The system is designed to accept D. C. signals from a single Higgitt channel at the rates of 62.5 or 70.9 words per minute and to retransmit the converted signals to a teleprinter or typing reperforator at the rate of seventy-five words per minute. This speed differential, together with the advantage of ten stored characters, provides the overlap needed for inserting the case-shift signals as well as for absorbing the incidental speed differences existing between the two codes.

With an input rate of 70.9 words per minute, the system having ten storage banks will correctly record 24 receptions comprised of the letters "T" and "E" or "E" followed by any figure before errors due to storage exhaustion occur. This combination of characters represents the severest possible test. Regular traffic messages have been handled through the system for a number of days without errors due to insufficient storage.

While the invention has been described in terms of a rather specific embodiment, it should be understood that other arrangements and modifications will be suggested to one skilled in the art without departing from the spirit and scope of the invention.

The invention claimed is:

1. An electric circuit arrangement for retransmitting in a given code having prearranged signals indicating the case of the subsequently transmitted characters intelligence received in a predetermined code having separate signals for characters of different case, including a plurality of storage relay banks each having at least one relay for each element of a character expressed in said given code, and at least one further relay for indicating the case of said character, a code translating circuit responsive to signals expressed in said predetermined code to energize the relays of said relay storage banks in accordance with the elements of the character as expressed in said given code, said relay storage banks being energized in succession at the incoming signal character rate, an output signalling circuit comprising a distributor, a selecting switch and a relay circuit, said relay circuit being arranged to operate said selecting switch under control of said distributor to connect said relay storage banks in succession to said distributor at a rate independent of the incoming signal rate and to prevent operation of said selecting switch for one selection when the case of the character to be transmitted differs from that of the character previously transmitted.

2. An electric circuit arrangement for retransmitting in a given code having prearranged signals indicating the case of the subsequently transmitted characters intelligence received in a predetermined code having separate signals for characters of different case, including a plurality of storage relay banks each having at least one relay for each element of a character expressed in said given code and at least one relay for indication of case, a code translating circuit responsive to signals expressed in said predetermined code to energize the relays of said relay storage banks in accordance with the elements and in accordance with the case of the character as expressed in said given code, said relay storage banks being energized in succession at the incoming signal character rate, an output signalling circuit comprising a case shift signal generating circuit, a distributor, a selecting switch and a relay circuit, said relay circuit being arranged to operate said selecting switch under control of said distributor to connect said relay storage banks in succession to said distributor at a rate independent of the incoming signal rate and to connect said case shift signal generating circuit to said distributor in accordance with the operation of said case indicating relay.

3. An electric circuit arrangement for producing an output signal train expressing intelligence in a given code in response to an incoming signal train expressing that intelligence in a predetermined code, said given code having separate characters for indicating the case of characters following immediately the case indicating characters, including a translator circuit responsive to said incoming signals to produce electric currents indicative of the received characters, a counting circuit responsive to incoming signals to produce electric currents indicative of the case of said received characters, a plurality of relay storage banks each having at least one relay for each element of a character to be expressed in the outgoing code and at least one further relay for case indication, a stepping switch responsive to the operation of said counting circuit to select said storage banks in succession at the incoming signal character rate for storage of intelligence therein by application of said electric currents to said relays, a signal output circuit comprising a distributor, a further stepping switch, a relay circuit under control of said distributor to connect said further stepping switch to said distributor to select said storage banks in succession at a rate independent of that of the selection by the first said stepping switch, to energize said distributor in accordance with the nature of the signal elements of the character under consideration, said relay circuit being interconnected with said further relay to disable said further stepping switch and energize said distributor in accordance with signal elements of the case shift signal required whenever the case of the next succeeding character differs from that of the last character under consideration.

4. A circuit arrangement for producing an output train of signals conveying intelligence expressed in a given code having prearranged signals indicating the case of the individual characters in response to an input train of signals expressing that intelligence in predetermined code having the case of the code characters indicated by the length thereof including a composite relay chain arranged to select one of a plurality of circuits corresponding to the character under consideration in response to the applied input signal train, signal relays individual to said circuits, each of said signal relays having associated contact assemblies for connecting to a source of potential in accordance with the marking elements of the character in said given code to which the relay corresponds, a group of storage relay banks, each of said banks having one relay for each element of the code characters expressed in said given code and a further relay for case indication, a switch actuated in response to operation of said composite relay chain to select one of said relay banks and energize the relays therein in accordance with the potentials set up by the selected signal relay corresponding to the character under consideration and to actuate said further relay to indicate the case of said character, a further switch to sequentially connect a distributor to the relays of each of said banks to produce an output signal train, and a relay circuit associated with said distributor to interpose said prearranged signals in said output signal train only when the case indicating relay for the character under consideration is energized differently than the case indicating relay for the preceding character.

5. A circuit arrangement for producing an output train of signals conveying intelligence expressed in a given code having the case of individual characters indicated by separate code characters in response to an input train of signals expressing said intelligence in another predetermined code having the case of the individual code characters indicated by the length thereof, including a composite relay chain responsive to the applied input signal train arranged to select circuits corresponding to the character under consideration, signal relays individual to said circuits, each of said signal relays having associated contact assemblies for connecting to a source of potential in accordance with the marking elements of the character under consideration in said given code to which the relay corresponds, a group of relay banks, each of said banks having one relay for each element of each character as expressed in an interim code, a switching arrangement actuated in response to operation of said composite relay chain to select one of said relay banks and energize the relays therein in accordance with the potentials set up by the selected signal relay corresponding to the character under consideration and in accordance with the case of said character, and a switching device to sequentially connect a distributor and a relay circuit to the relays of each of said banks to produce an output signal train, said relay circuit having alternately operable relays to produce said separate code characters and further relays to interpose said produced code characters in said output signal train only when the case of the character under consideration differs from the case of the succeeding character.

6. A circuit arrangement for producing an output train of signals conveying intelligence expressed in a fixed-unit printer code in response to an input train of signals expressing said intelligence in telegraph code, including a composite relay chain arranged to select one of a plurality of circuits corresponding to the character under consideration in response to applied input signal train, signal relays individual to said circuits, each of said signal relays having associated contact assemblies for connecting to a source of potential in accordance with the marking elements of the character in printer code to which the relay corresponds, a group of relay banks, each of said banks having one relay for each element of the printer code and a case indicating relay, a switching device actuated in response to operation of said composite relay chain to select one of said relay banks and energize the relays therein in accordance with the elements of printer code and the case of said character under consideration, and a further switching device to sequentially connect a distributor and a case shift signalling circuit to the relays of each of said banks to produce an output signal train, said case shift signalling circuit being arranged to insert case shift signals in said output signal train only in response to changes in the case shift of succeeding characters.

7. An electric circuit arrangement for producing a train of signals conveying intelligence expressed in a given code from a plurality of signal storage devices having elemental units thereof actuated in accordance with the nature of the elements of the characters to be conveyed as expressed in said code and in accordance with the nature of the case of said characters, including distributing apparatus, a selector responsive to said distributing apparatus to sequentially connect said signal storage device to said distributing apparatus to produce a signal train in accordance with the character elements stored in said storage device, and a case shift signalling circuit interposed between said storage device selector and said distributing apparatus to insert a case shift signal in said signal train only when the nature of the case of succeeding characters changes, said case shift signalling circuit comprising complementary case relays, each having contact assemblies arranged to energize said distributor in accordance with the respective case shift signals and to disconnect said storage bank selecting device during transmission of the case shift signal, a holding device coupled to said case relays to hold the same energized during transmission of the case shift signals, and reciprocal case detector relays, each having contact assemblies interconnected to actuate the corresponding case relay only when the nature of the case of succeeding characters contained in succeeding storage devices differs.

8. An electric circuit arrangement for producing a train of signals conveying intelligence expressed in a given code from a plurality of relay storage banks having the individual relays thereof energized in accordance with the nature of the elements of the characters to be conveyed as expressed in said code and in accordance with the nature of the case of said characters, including a distributor, a selecting device responsive to said distributor to sequentially connect said storage banks to said distributor to produce a signal train in accordance with the character elements stored in said banks, and a case shift signalling circuit interposed between said storage bank selecting device and said distributor to insert a case shift signal in said signal train only when the nature of the case of succeeding characters changes, said case shift signalling circuit comprising complementary case relays, each having contact assemblies arranged to energize said distributor in accordance with the respective case shift signals and to disconnect said storage bank selecting device during transmission of the case shift signal, a holding relay intercoupled with said case relays to hold the same energized for the duration of transmission of a case shift signal, and reciprocal case detector relays, each having contact assemblies intercoupled to actuate the corresponding case relay only when the nature of the case of characters contained in succeeding storage banks changes in the respective direction and to prevent further operation of the same relay until the other has operated.

9. An electric circuit arrangement for producing a train of signals conveying intelligence expressed in a code having the case of the individual characters indicated by means of separately interposed characters, including a plurality of relay storage banks having a plurality of relays thereof adapted to be energized in accordance with the nature of the elements of the characters to be conveyed as expressed in said code and a further relay adapted to be energized in accordance with the nature of the case of said characters, a start-stop distributor, a selecting device responsive to said start-stop distributor to sequentially connect said storage banks to said distributor to produce a signal train in accordance with the character elements as stored in said plurality of relays, and a case shift signalling circuit interposed between said storage bank selecting device and said distributor to insert a case shift signal in said signal train only when the nature of the energization of said further relay of succeeding storage banks changes, said case shift signalling circuit comprising an obverse case relay and a reverse case relay, each having contact assemblies arranged to energize said distributor in accordance with the respective one of said separately interposed case shift characters and to disconnect said storage bank selecting device for the duration of transmission of the case shift character, a holding relay intercoupled with said case relays to hold the same energized during transmission of the case shift signals, and an obverse-case sensing relay and a reverse-case sensing relay, each having contact assemblies arranged to actuate the corresponding case relay only when the nature of energization of the further relay of succeeding storage banks changes in the respective direction and to prevent further operation of the same relay until the other has operated.

10. An electric circuit arrangement for producing a train of signals conveying intelligence expressed in a code having the case of the individual character indicated by means of separately interposed characters, including a plurality of relay storage banks having a plurality of relays thereof adapted to be energized in accordance with the nature of the elements of the characters to be conveyed as expressed in said code and a further relay adapted to be energized in accordance with the nature of the case of said characters, a start-stop distributor, a selecting device responsive to said start-stop distributor to sequentially connect said storage banks to said distributor to produce a signal train in accordance with the character elements as stored in said plurality of relays, and a case shift signalling circuit interposed between said storage bank selecting device and said distributor to insert a case shift signal in said signal train only when the nature of the energization of said further relay of succeeding storage banks changes, said case shift signalling circuit comprising an obverse case relay and a reverse case relay, each having contact assemblies arranged to energize said distributor in accordance with the respective one of said separately interposed case shift characters and to disconnect said storage bank selecting device for the duration of transmission of the case shift character, a holding relay intercoupled with said case relays to hold the same energized during transmission of the case shift signals, an obverse-case sensing relay and a reverse-case sensing relay, each having contact assemblies arranged to actuate the corresponding case relay only when the nature of energization of the further relay of succeeding storage banks changes in the respective direction and to prevent further operation of the same relay until the other has operated, and a circuit coupling normally open contacts on at least one and normally closed contacts on at least one other of said plurality of relays to said case shift signalling circuit to render the same inoperative for a prearranged code character.

11. An electric circuit arrangement for producing a train of signals conveying intelligence expressed in a code having the characters thereof divided into upper and lower cases, the case of the character under consideration being determined by the last case shift character preceding the character, including a plurality of relay storage banks having a plurality of relays thereof adapted to be energized in accordance with the nature of the elements of the characters to be conveyed as expressed in said code and a further relay adapted to be energized in accordance with the nature of the case of said characters and a holding relay adapted to maintain the energization of the first said relays, a start-stop distributor, a selecting switch responsive to said start-stop distributor to connect a storage bank to said distributor to produce a signal in accordance with the character elements as stored in said plurality of relays, and a case shift signalling circuit interposed between said storage bank selecting device and said distributor to insert a case shift signal before said signal only when the nature of the energization of said further relay of the succeeding storage banks differs, said case shift signalling circuit comprising an upper-case relay and a lower-case relay, each having contact assemblies arranged to energize said distributor in accordance with the respective one of said case shift characters and to immobilize said storage bank selecting switch for the duration of transmission of the case shift character, a holding relay intercoupled with said case relays to hold the same energized during transmission of the case shift character, an upper case detector relay and a lower case detector relay, each having contact assemblies arranged to actuate the corresponding case relay only when the nature of the energization of the further relay of succeeding storage banks reverses and to prevent further operation of the same relay until the other has operated, and a connection from said distributor to said further relay of the storage bank under consideration to energize the same after transmission of the character stored therein to ready the storage bank for the next character to be stored.

12. An electric circuit arrangement for retransmitting at a substantially constant character rate in a given code having prearranged signals indicating the case of the subsequently transmitted characters intelligence received in a predetermined code at a variable instantaneous character rate having separate signal for characters of different case, including a plurality of storage relay banks each having at least one relay for each element of a character expressed in said given code, and at least one further relay for indicating the case of said character, a code translating circuit responsive to signals expressed in said predetermined code to energize the relays of said storage relay banks in accordance with the elements of the character as expressed in said given code, said storage relay banks being energized in succession at the incoming signal character rate, an output signalling circuit comprising distributing apparatus, a selector responsive to said distributing apparatus to sequentially connect said storage relay banks to said distributing apparatus to produce a signal train in accordance with the character elements stored in said storage relays, and a case shift signalling circuit interposed between said storage bank selector and said distributing apparatus to insert a case shift signal in said signal train only when the nature of the case of succeeding characters changes, said case shift signalling circuit comprising complementary case relays, each having contact assemblies arranged to energize said distributing apparatus in accordance with the respective case shift signals and to disconnect said storage bank selecting device during transmission of the case shift signal, and reciprocal case detector relays, each having contact assemblies interconnected to actuate the corresponding case relay only when the nature of the case of succeeding characters contained in succeeding storage relay banks differs.

13. An electric circuit arrangement for retransmitting at a given average character rate in a given code having prearranged signals indicating the case of the subsequently transmitted characters intelligence received in a predetermined code at an average character rate not greater than said given average character rate having separate signals for characters of different case, including a plurality of storage relay banks each having at least one relay for each element of a character expressed in said given code, and at least one further relay for indicating the case of said character, a code translating circuit responsive to signals expressed in said predetermined code to energize the relays of said storage relay banks in accordance with the elements of the character as expressed in said given code, said storage relay banks being energized in succession at the incoming signal character rate, an output signalling circuit comprising a distributor, selecting apparatus to sequentially connect said signal storage device to said distributor to produce a signal train in accordance with the character elements stored in said storage device, and a case shift signalling circuit interposed between said storage bank selecting apparatus and said distributor to insert a case shift signal in said signal train only when the nature of the case of succeeding characters changes, said case shift signalling circuit comprising complementary case relays, each having contact assemblies arranged to energize said distributor in accordance with the respective case shift signals and to disconnect said storage bank selecting apparatus during transmission of the case shift signal, and reciprocal case detector relays, each having contact assemblies interconnected to actuate the corresponding case relay only when the nature of the case of succeeding characters contained in succeeding storage relay banks differs.

14. An electric circuit arrangement for retransmitting in a fixed unit teleprinter code intelligence received in continental Morse or Higgitt code, including a plurality of storage relay banks each having at least one relay for each element of a character expressed in said given code, and at least one further relay for indicating the case of said character, a code translating circuit responsive to signals expressed in said predetermined code to energize the relays of said storage relay banks in accordance with the elements of the character as expressed in said given code, said storage relay banks being energized in succession at the incoming signal character rate, an output signalling circuit comprising distributing apparatus, a selector responsive to said distributing apparatus to sequentially connect said storage relay banks to said distributing apparatus to produce a signal train in accordance with the character elements stored in said storage relay banks and a case shift signalling circuit interposed between said storage bank selector and said distributing apparatus to insert a case shift signal in said signal train only when the nature of the case of succeeding characters changes, said case shift signalling circuit comprising complementary case relays, each having contact assemblies arranged to energize said distributing apparatus in accordance with the respective case shift signals and to disconnect said storage bank selector during transmission of the case shift signal and to hold the same energized during transmission of the case shift signals, and reciprocal case detector relays each having contact assemblies interconnected to actuate the corresponding case relay only when the nature of the case of succeeding characters contained in succeeding storage relay banks differs.

JAMES ALBERT SPENCER.
EDWIN RAYMOND LIBERG.

REFERENCES CITED

The following references are of record in the file of this patent:

UNITED STATES PATENTS

| Number | Name | Date |
|---|---|---|
| 2,228,417 | Spencer | Jan. 14, 1941 |
| 2,458,144 | Bush | Jan. 4, 1949 |
| 2,565,267 | Potts | Aug. 21, 1951 |